United States Patent
Harada (10) Patent No.: US 9,853,568 B2
(45) Date of Patent: Dec. 26, 2017

(54) POWER CONVERSION DEVICE (71) Applicant: MITSUBISHI ELECTRIC CORPORATION, Chiyoda-ku, Tokyo (JP)

(72) Inventor: Ryotaro Harada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/027,874

(22) PCT Filed: Nov. 27, 2013

(86) PCT No.: PCT/JP2013/081934
§ 371 (c)(1),
(2) Date: Apr. 7, 2016

(87) PCT Pub. No.: WO2015/079518
PCT Pub. Date: Jun. 4, 2015

(65) Prior Publication Data
US 2016/0276955 A1  Sep. 22, 2016

(51) Int. Cl.
*H02M 7/44* (2006.01)
*H02M 7/537* (2006.01)
(Continued)

(52) U.S. Cl.
CPC ............ *H02M 7/537* (2013.01); *H02M 1/08* (2013.01); *H02M 1/32* (2013.01);
(Continued)

(58) Field of Classification Search
CPC .................. H02M 7/44; H02M 7/537; H02M 2001/0009; H02M 2007/4815
(Continued)

(56) References Cited

U.S. PATENT DOCUMENTS 5,402,043 A * 3/1995 Nilssen ............ H02M 7/53832
 315/209 R
5,658,132 A * 8/1997 Akazawa ............. B60H 1/3222
 318/803
(Continued)

FOREIGN PATENT DOCUMENTS

JP  11-215826 A  8/1999
JP  2005-071841 A  3/2005
(Continued)

OTHER PUBLICATIONS

International Search Report (PCT/ISA/210) dated Feb. 10, 2014, by the Japanese Patent Office as the International Searching Authority for International Application No. PCT/JP2013/081934.
(Continued)

*Primary Examiner* — Adolf Berhane
*Assistant Examiner* — Nusrat Quddus
(74) *Attorney, Agent, or Firm* — Buchanan Ingersoll & Rooney PC (57) ABSTRACT

The resonant inverter circuit includes two or more switch elements. A detector detects an output current of the switch elements. A resonance frequency determiner determines that the resonance frequency of the resonant inverter circuit is abnormal when a number of times an absolute value of a current detected by the detector at turn-off of the switch elements is equal to or greater than a threshold is equal to or greater than a predetermined number of times that is two or more during a predetermined period that is equal to or longer than two switching periods of the switch elements. A controller causes the resonant inverter circuit to stop a switching operation when the resonance frequency determiner determines that the resonance frequency of the resonant inverter circuit is abnormal.

5 Claims, 5 Drawing Sheets

(51) Int. Cl.
  *H02M 1/32* (2007.01)
  *H02M 1/08* (2006.01)
  *H02M 7/48* (2007.01)
  *H02M 1/00* (2006.01)

(52) U.S. Cl.
  CPC ............... *H02M 2001/0009* (2013.01); *H02M 2007/4815* (2013.01); *Y02B 70/1441* (2013.01)

(58) Field of Classification Search
  USPC ............ 363/44–50, 52–53, 55, 56.01, 56.02, 363/95–97, 131–132
  See application file for complete search history.

(56) References Cited

U.S. PATENT DOCUMENTS

| | | | | |
|---|---|---|---|---|
| 5,773,937 | A * | 6/1998 | Miyazaki | H05B 41/2882 313/637 |
| 2003/0164691 | A1 * | 9/2003 | Ueda | F04B 35/045 318/135 |
| 2008/0055941 | A1 | 3/2008 | Victor et al. | |
| 2012/0300502 | A1 | 11/2012 | Shimada et al. | |
| 2013/0164013 | A1 * | 6/2013 | Kondo | G03G 15/2039 399/67 |

FOREIGN PATENT DOCUMENTS

| | | |
|---|---|---|
| JP | 2010-153089 A | 7/2010 |
| JP | 2010-187478 A | 8/2010 |
| JP | 2011-135723 A | 7/2011 |
| JP | 2012-248292 A | 12/2012 |
| JP | 2012-249375 A | 12/2012 |

OTHER PUBLICATIONS

Written Opinion (PCT/ISA/237) dated Feb. 10, 2014, by the Japanese Patent Office as the International Searching Authority for International Application No. PCT/JP2013/081934.

Canadian Office Action issued by the Canadian Intellectual Property Office dated Mar. 1, 2017, in corresponding Canadian Application No. 2,931,657 (4 pages).

* cited by examiner

POWER CONVERSION DEVICE

TECHNICAL FIELD

The present disclosure relates to a power conversion device using a current resonant inverter.

BACKGROUND ART

Power conversion devices for converting a DC voltage into an AC voltage with medium- and high-frequency resonant inverters using current resonance are used for applications such as railcars or solar power generation (see Patent Literature 1). A current resonant inverter creates a moment at which a current is zero using resonance of an LC circuit within a switching circuit, and turns off a power semiconductor switch element at the timing, thereby reducing switching loss. The current resonance causes turn-off loss of the power semiconductor to be substantially zero, which advantageously provides a power conversion device with low losses.

When a switch is activated at a frequency different from a resonance frequency of the inverter circuit, the resonant inverter may have a risk of breaking a switch element because an off-resonance occurs and an overcurrent passes through the switch. For example, Patent Literature 2 discloses a control method for preventing a switch element from breaking due to an off-resonance in a series resonant converter. Patent Literature 2 discloses a half-bridge current resonant converter in which a current of a secondary rectifier diode, which does not flow during a steady operation (at a normal frequency), is detected to determine an off-resonance.

Patent Literature 3 discloses a method for controlling an induction-heating power source, in which when a switching loss at turn-off exceeds an allowable setpoint in a full-bridge current resonant inverter, operation of the inverter is stopped. Patent Literature 4 discloses a control circuit for a switching power source, in which, when an off-resonance is detected from a detected value of an output current of a complex current resonant converter, a switch element is turned off. Patent Literature 4 also discloses that a signal for turning a switch element on is blocked while a current flowing through an impedance element is detected with both of two switch elements turned off.

CITATION LIST

Patent Literature

Patent Literature 1: US Patent Application Publication No. 2008/0055941
Patent Literature 2: Unexamined Japanese Patent Application Kokai Publication No. 2010-187478
Patent Literature 3: Unexamined Japanese Patent Application Kokai Publication No. 2010-153089
Patent Literature 4: Unexamined Japanese Patent Application Kokai Publication No. 2011-135723

SUMMARY OF INVENTION

Technical Problem

When a resonance frequency of an inverter circuit changes for some reason, a power semiconductor switch element is turned off in a state in which current flows through the switch element, thus increasing turn-off loss. During such operation, as the current resonant inverter is a medium- and high-frequency circuit, the loss of the power semiconductor increases rapidly. Then, a temperature detector mounted on a base surface of a cooler for cooling the power semiconductor may fail to detect a rapid change in temperature of the power semiconductor. This failure may cause a junction temperature of the power semiconductor to exceed its limit before the over-temperature protection of the inverter circuit operates, which leads to breakdown. For example, a current shutdown state occurs whenever the resonance frequency of the circuit decreases due to cutting of a portion of a transformer winding, a short circuit thereof, or the like. The power semiconductor switch element requires protection from the current shutdown state.

The temperature-based protection approach involves stopping the switching operation when the temperature detected by a thermistor exceeds a given temperature. However, this approach does not allow the power semiconductor to be protected from the over-temperature condition. Thus, the current shutdown state of the power semiconductor is detected to stop the switching operation. For example, when the switch element is turned off immediately after detection of the off-resonance, detection of the off-resonance due to effects of noises or the like also causes the inverter to stop temporarily. However, for applications, such as electric railcars, in which frequent shutdowns of the power supply are undesirable, continuous running as long as possible is required.

The present disclosure is made to solve the above described problems, and an objective of the present disclosure is to protect a switch element of a resonant inverter circuit and to prevent excessive stoppage of the resonant inverter circuit when a resonance frequency of the resonant inverter circuit changes.

Solution to Problem

A power conversion device according to the present disclosure includes a resonant inverter circuit including two or more switch elements, a detector to detect an output current of the switch elements, a resonance determiner, and a controller. The resonance determiner determines that a resonance frequency of the resonant inverter circuit is abnormal when a number of times an absolute value of a current detected by the detector at turn-off of the switch elements is equal to or greater than a threshold is equal to or greater than a predetermined number of times that is two or more during a predetermined period that is at least twice a switching period of the switch elements. The controller causes the switching operation of the resonant inverter circuit to stop when the resonance determiner determines that the resonance frequency of the resonant inverter circuit is abnormal.

Advantageous Effects of Invention

According to the techniques of the present disclosure, when the number of times the absolute value of the current detected by the detector at turn-off of the switch elements is equal to or greater than a threshold is equal to or greater than a predetermined number of times that is two or more during a predetermined period that is equal to or longer than two switching periods, the resonance frequency of the resonant inverter circuit is determined as being abnormal and the switching operation is stopped, which protects the switch elements of the resonant inverter circuit and prevents excessive stoppage of the resonant inverter circuit when the resonance frequency of the resonant inverter circuit changes.

DESCRIPTION OF EMBODIMENTS

Embodiment 1

Figure 1:
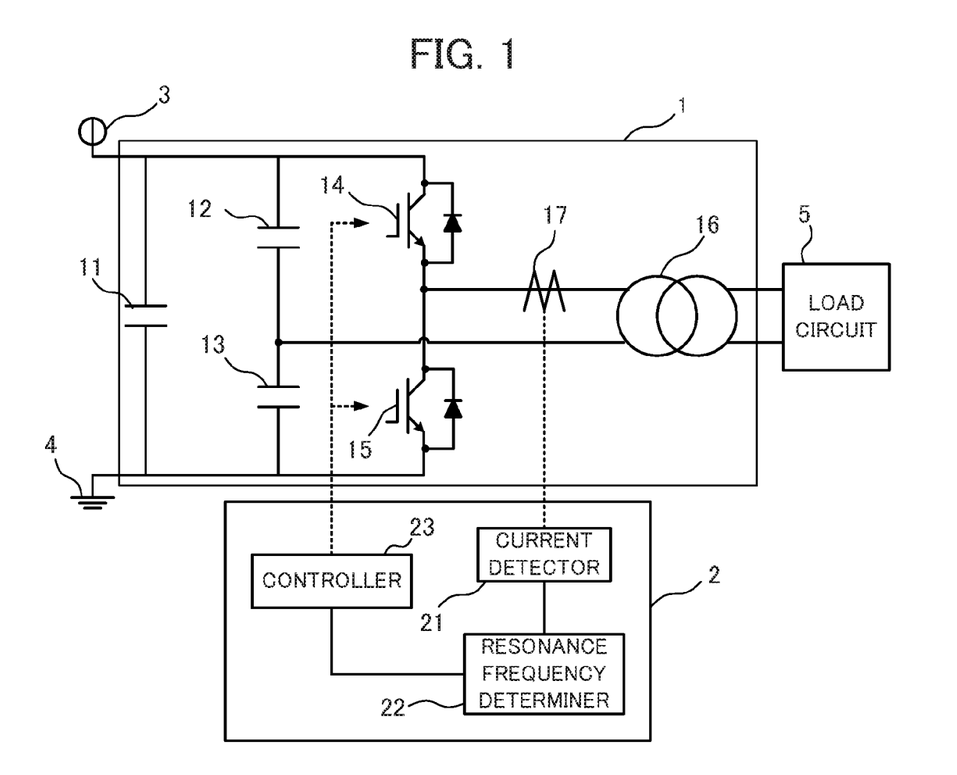
FIG. 1 is a block diagram illustrating an example arrangement of a power conversion device according to an embodiment of the present disclosure.

FIG. 1 is a block diagram illustrating an example arrangement of a power conversion device according to an embodiment of the present disclosure. The power conversion device includes a resonant inverter circuit 1 and a control device 2. The resonant inverter circuit 1 is connected to a DC power source 3 and a ground 4, and receives DC power supplied by the DC power source 3. The control device 2 activates the resonant inverter circuit 1 to cause the resonant inverter circuit 1 to convert the DC voltage into an AC voltage and supply the AC power to a load circuit 5.

The resonant inverter circuit 1 includes a filter capacitor 11, resonant capacitors 12 and 13, switch elements 14 and 15, a resonant transformer 16, and a detector 17. The filter capacitor 11 blocks noises of the DC power source 3 to reduce a variation in voltage applied to the switch elements 14 and 15.

The resonant capacitors 12 and 13 are connected in series. Before the start of operation of the resonant inverter circuit 1, the divided DC voltages are each applied to the corresponding one of the resonant capacitors 12 and 13. The values of the capacitances of the resonant capacitors 12 and 13 may be the same or different. When the resonant capacitors 12 and 13 have the same capacitance, the voltages of the capacitors are the same. The resonant capacitors 12 and 13 may be constituted by a plurality of capacitors connected in series and/or in parallel. In that case, the capacitances of the resonant capacitors 12 and 13 are combined capacities of the pluralities of capacitors. The switch elements 14 and 15 may also be constituted by a plurality of elements.

Although FIG. 1 illustrates as an example the switch elements 14 and 15 each as an insulated gate bipolar transistor (IGBT), the switch elements 14 and 15 are not limited to the IGBT, but can be any element controllable with a gate signal. The switch elements 14 and 15 are connected in series and are connected to the resonant capacitors 12 and 13 in parallel.

The resonant transformer 16 includes a primary winding and a secondary winding, and both ends of the primary winding of the resonant transformer 16 are each connected to a corresponding connection point, that is, a connection point between the resonant capacitors 12 and 13 or a connection point between the switch elements 14 and 15. The detector 17 is disposed between one end of the resonant transformer 16 and the connection point between the switch elements 14 and 15, and outputs a voltage proportional to the output current of the switch elements 14 and 15.

The control device 2 alternately turns the switch elements 14 and 15 on and off to cause the resonant capacitors 12 and 13 and the resonant transformer 16 to cooperate together to generate an AC voltage across the resonant transformer 16. The control device 2 starts activating the resonant inverter circuit 1, for example, when an input voltage directed to the resonant inverter circuit 1 and detected by an unillustrated input voltage detector falls into a predetermined range. The control device 2 stops the resonant inverter circuit 1, for example, when the input voltage to the resonant inverter circuit 1 exceeds a threshold and exhibits an overvoltage.

It is assumed that the resonant capacitors 12 and 13 have the same value of capacitance and the control device 2 outputs a gate signal that enables the switch element 14 to be turned on for a predetermined conduction time at the start of operation of the resonant inverter circuit 1. The control device 2 outputs a gate signal so that the switch elements 14 and 15 are alternately turned on for the conduction time during operation of the resonant inverter circuit 1. A short-circuit protection time is also provided in which the switch elements 14 and 15 are both turned off.

While the switch element 14 is turned on and the switch element 15 is turned off, a current passes from the DC power source 3, through the switch element 14, the resonant transformer 16, and the resonant capacitor 13, to the ground 4. While the switch element 15 is turned on and the switch element 14 is turned off, a current passes from the DC power source 3, through the resonant capacitor 12, the resonant transformer 16, and the switch element 15, to the ground 4.

Because the resonant transformer 16 and the resonant capacitor 12 are connected in series or the resonant transformer 16 and the resonant capacitor 13 are connected in series, a current oscillates at a resonance frequency determined by an inductance of the resonant transformer 16 and the capacitances of the resonant capacitors 12 and 13. The switching loss can be reduced by turning off the switch elements 14 and 15 when the current is zero.

Figure 2:
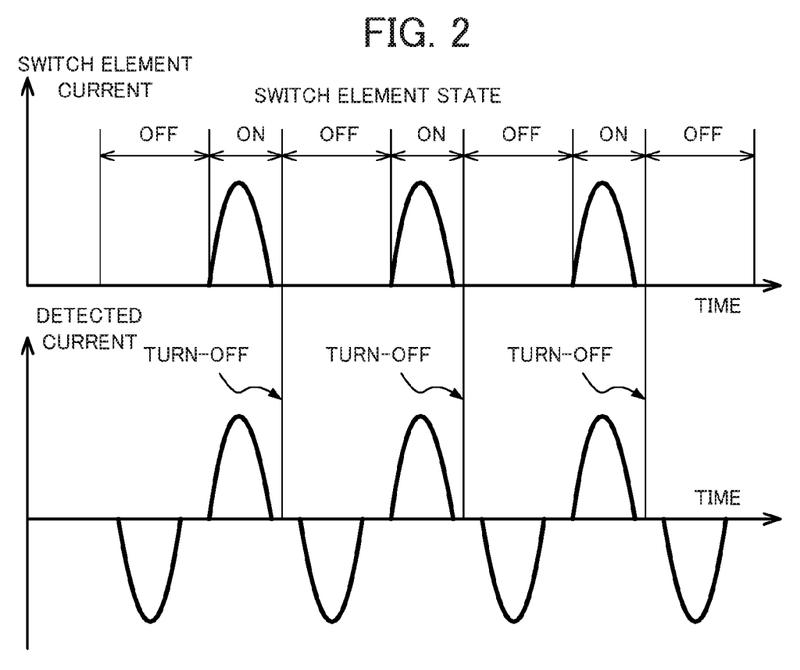
FIG. 2 is a diagram illustrating current waveforms of a normal resonance frequency of a resonant inverter circuit.

FIG. 2 illustrates current waveforms of normal resonance frequency of the resonant inverter circuit. The upper graph of FIG. 2 shows a current of the switch element 14. The lower graph of FIG. 2 shows a current detected by the detector 17. As the switch element 15 is turned on while the switch element 14 is turned off, the detected current appears alternately as positive or negative.

As illustrated in FIG. 2, the current changes so as to oscillate at the resonance frequency determined by the resonant transformer 16 and the resonant capacitors 12 and 13. Then, the current of the switch element is turned off while the current is zero. Here, when the resonance frequency determined by the resonant transformer 16 and the resonant capacitors 12 and 13 decreases for some reason, a period of the current oscillation increases. In that case, when the switch elements 14 and 15 are turned off at the same timing after the switch elements 14 and 15 have been turned on, the current still flows at the turn-off timing.

Figure 3:
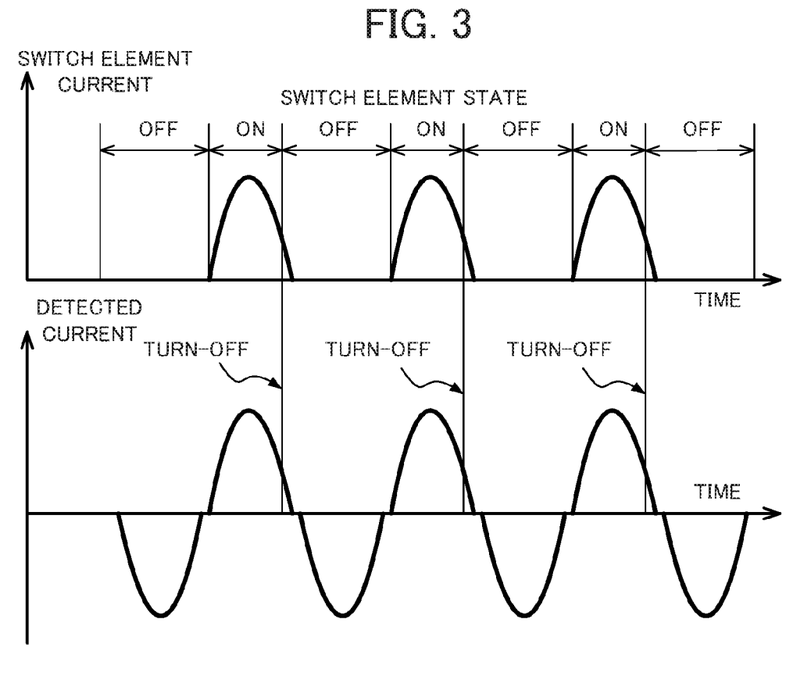
FIG. 3 is a diagram illustrating current waveforms at decreased resonance frequency of the resonant inverter circuit.

FIG. 3 illustrates current waveforms at decreased resonance frequency of the resonant inverter circuit. As can been seen, the resonance current has a longer period, and the current thus still flows at turn-off of the switch elements 14 and 15.

The control device 2 of FIG. 1 includes a current detector 21, a resonance frequency determiner 22, and a controller

23. The current detector 21 performs analog-to-digital conversion of a voltage proportional to the voltage detected by the detector 17 to output a current value. The resonance frequency determiner 22 determines that the resonance frequency of the resonant inverter circuit 1 is abnormal when a number of times an absolute value of the current detected by the detector 17 at turn-off of the switch elements 14 and 15 is equal to or greater than a threshold is a predetermined number of times that is two or more during a predetermined period that is at least twice a switching period of the switch elements 14 and 15. The controller 23 stops the switching operation of the resonant inverter circuit 1 when the resonance frequency determiner 22 determines that the resonance frequency of the resonant inverter circuit 1 is abnormal. The control device 2 also stops the resonant inverter circuit 1 when the current detected by the detector 17 and flowing into the resonant transformer 16 exceeds a threshold and becomes an overcurrent.

The conditions for the resonance frequency determiner 22 to determine that the resonance frequency is abnormal can be determined as appropriate for properties and use of the resonant inverter circuit 1. The conditions can be freely set within a range in which M≥N≥2, where the determination period is M times the switching period (M is an integer equal to or greater than 2), and N is a defined number of times that the absolute value of the current detected by the detector 17 at turn-off of the switch elements 14 and 15 is equal to or greater than a threshold for the resonance frequency to be determined to be abnormal (N is an integer equal to or greater than 2).

Figure 4:
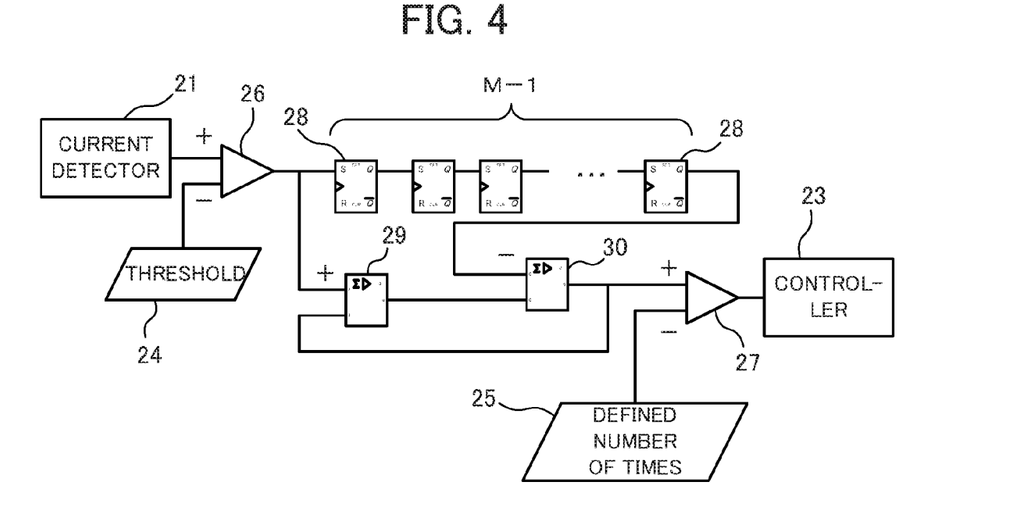
FIG. 4 is a diagram illustrating an example of a logic circuit of a resonance frequency determiner.

FIG. 4 is a diagram illustrating an example of a logic circuit of a resonance frequency determiner. The resonance frequency determiner 22 uses a comparator 26 to compare a current value output by the current detector 21 versus a threshold of a register 24 for each turn-off of the switch elements 14 and 15, for example. The comparator 26 then outputs, to a shift register 28 and an adder 29, "1" for the current value equal to or greater than the threshold and "0" for the current value less than the threshold. M−1 shift registers (flip-flops) 28 are connected in series, where the switching cycle time interval for determination is M periods (M is an integer equal to or greater than 2). The output of the last shift register 28 is input to a subtractor 30. The subtractor 30 receives an input of a result of the adder 29 and subtracts the output of the last shift register 28 from the result of the adder 29.

The result of the subtractor 30 is input to a comparator 27 and returned to the adder 29 in the next period. The adder 29 and the subtractor 30 cooperate together for addition of the current result of the comparator 26 and subtraction of the result M periods earlier of the comparator 26. The comparator 27 compares the result of the subtractor 30 with a defined number of times of the register 25 (for example, N), and outputs, to the controller 23, "1 (abnormal resonance frequency)" when the comparison result is equal to or greater than the defined number of times and "0 (normal resonance frequency)" when the comparison result is less than the defined number of times. As a result, the resonance frequency determiner 22 determines that the resonance frequency is abnormal when the number of times the absolute value of the current detected by the detector 17 at turn-off of the switch elements 14 and 15 is equal to or greater than a threshold is equal to or greater than the defined number of times (N) during a period that is M times the switching period.

The current at turn-off of the switch elements 14 and 15 may be detected only when either one of the switch elements 14 and 15 is turned off, or may be detected only when both the switch elements 14 and 15 are turned off. The determination period of current detection when both the switch elements 14 and 15 are turned off is a half that of current detection when either one thereof is turned off.

Figure 5:
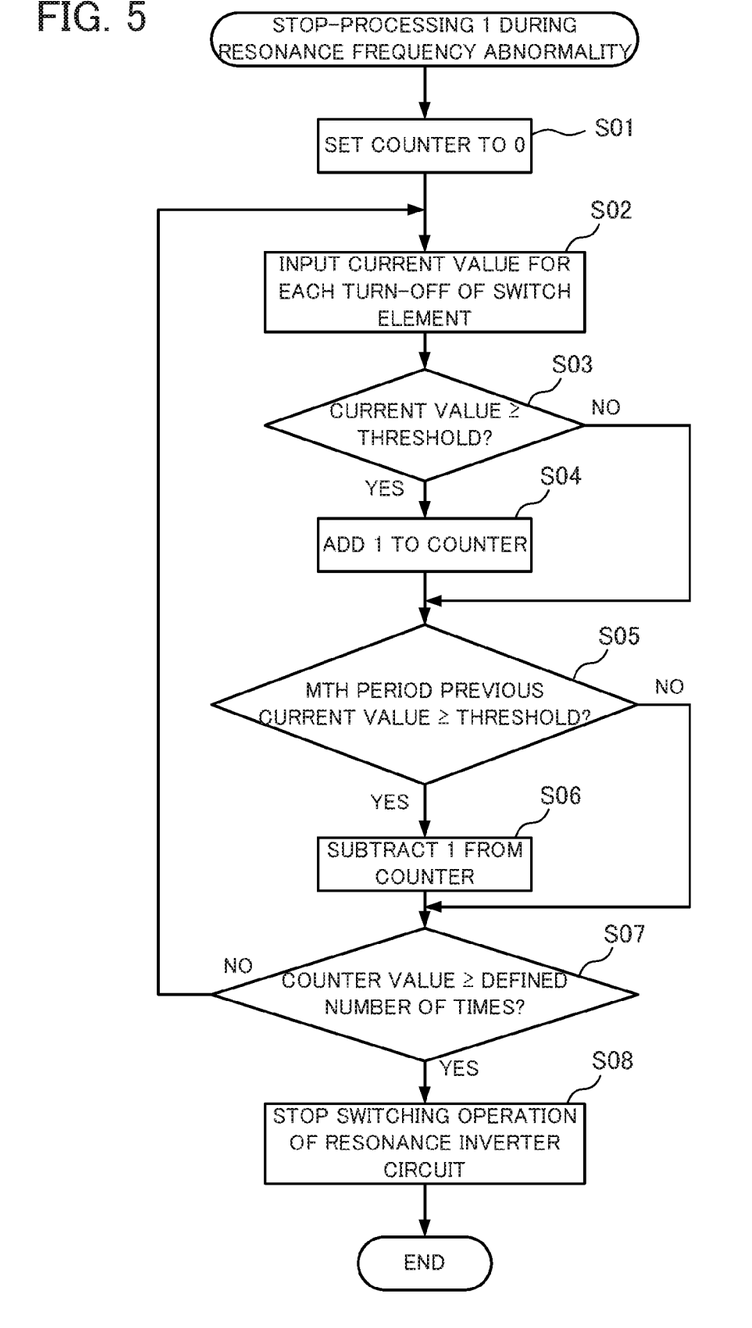
FIG. 5 is a flowchart illustrating an example operation of stop processing during a resonance frequency abnormality, according to Embodiment 1 of the present disclosure.

FIG. 5 is a flowchart illustrating an example operation of stop processing during a resonance frequency abnormality, according to Embodiment 1. The resonance frequency determiner 22 initially sets a counter to zero (step S01). The counter indicates the number of times the absolute value of the current detected by the detector 17 at turn-off of the switch elements 14 and 15 is equal to or greater than a threshold. Then, the current value detected by the detector 17 is input for each turn-off of the switch elements 14 and 15 (step S02).

The current value is compared to a threshold, and if the current value is equal to or greater than the threshold (step S03; YES), 1 is added to the counter (step S04). If the current value is less than the threshold (step S03; NO), the counter value remains the same. Then, if the current value M periods earlier (M is an integer equal to or greater than 2) is equal to or greater than a threshold (step S05; YES), 1 is subtracted from the counter (step S06). If the current value M periods earlier (M is an integer equal to or greater than 2) is less than a threshold (step S05; NO), the counter value remains the same.

The counter value is compared to the defined number of times, and if the counter value is equal to or greater than the defined number of times (step S07; YES), the switching operation of the resonant inverter circuit 1 is stopped (step S08). If the counter value is less than the defined number of times (step S07; NO), the processing returns to step S02 and restarts with input of the current value.

As described above, the power conversion device of Embodiment 1 determines that the resonance frequency of the resonant inverter circuit 1 is abnormal when the number of times the absolute value of the current detected by the detector 17 at turn-off of the switch elements 14 and 15 is equal to or greater than the threshold is equal to or greater than the predetermined number of times that is two or more during a predetermined period that is at least twice a switching period, and then the switching operation is stopped. As a result, when the resonance frequency of the resonant inverter circuit 1 changes, the switch elements 14 and 15 of the resonant inverter circuit 1 are protected, and excessive stoppage of the resonant inverter circuit 1 is prevented.

Embodiment 2

In Embodiment 2, a resonance frequency abnormality is determined when a number of times an absolute value of a current detected by a detector 17 for each turn-off of switch elements 14 and 15 is equal to or greater than a threshold continues to be equal to or greater than a defined number of times. Specifically, this condition corresponds to M=N≥2 in the configuration of Embodiment 1, which means that the M periods that are a determination period (M is an integer equal to or greater than 2) are equal to a defined number of times N used for determining that the resonance frequency is abnormal (N is an integer equal to or greater than 2).

Figure 6:
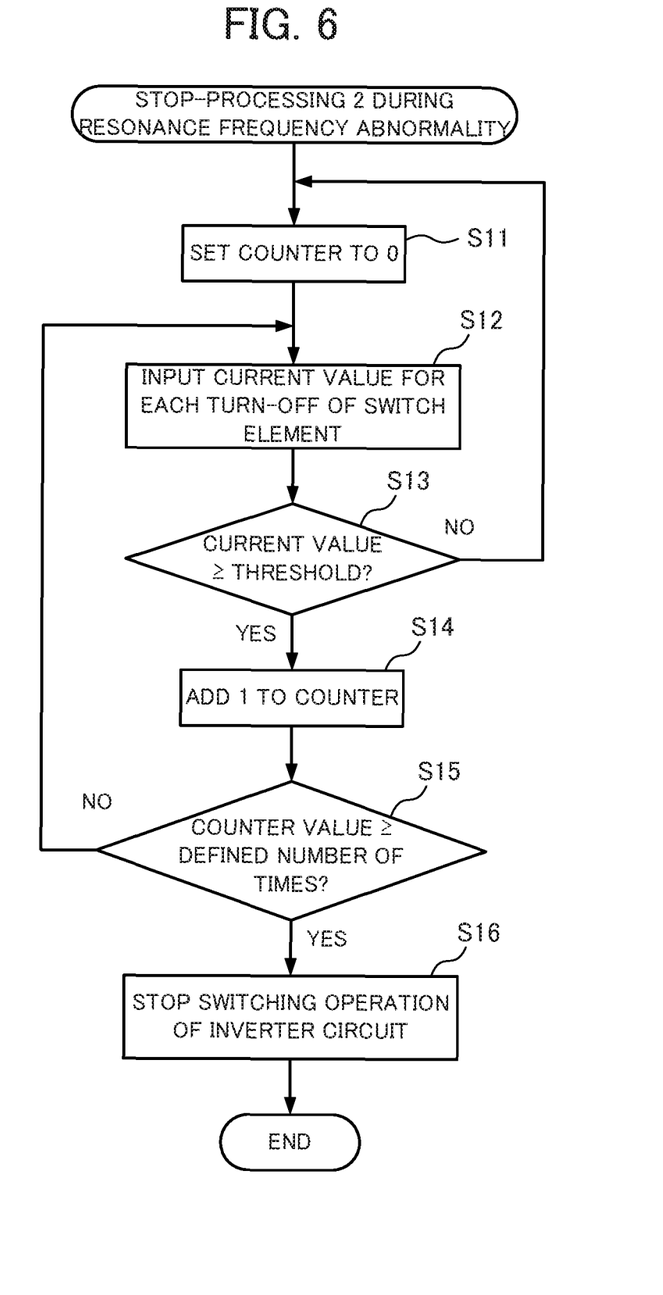
FIG. 6 is a flowchart illustrating an example operation of stop processing during a resonance frequency abnormality, according to Embodiment 2 of the present disclosure.

FIG. 6 is a flowchart illustrating an example operation of stop processing during a resonance frequency abnormality, according to Embodiment 2. A resonance frequency determiner 22 initially sets a counter to zero (step S11). The counter indicates the number of times the absolute value of the current detected by the detector 17 at turn-off of the switch elements 14 and 15 is equal to or greater than a threshold. Then, the current value detected by the detector 17 is input for each turn-off of the switch elements 14 and 15 (step S12).

The current value is compared to a threshold, and if the current value is equal to or greater than the threshold (step S13; YES), 1 is added to the counter (step S14). If the current value is less than the threshold (step S13; NO), processing returns to step S11 and restarts with a reset of the counter (set to 0).

After 1 is added to the counter in step S14, the counter value is compared to a defined number of times, and if the counter value is equal to or greater than the defined number of times (step S15; YES), the switching operation of the resonant inverter circuit 1 is stopped (step S16). If the counter value is less than the defined number of times (step S15; NO), the process is returned to step S12 without resetting of the counter and repeated from an input of the current value.

As stated above, according to Embodiment 2, the abnormal resonance frequency is determined to occur when the number of times the absolute value of the current detected by the detector 17 for each turn-off of the switch elements 14 and 15 is equal to or greater than the threshold continues to be equal to or greater than the defined number of times. This thus allows for simple configuration of the resonance frequency determiner 22.

In the above embodiments, to facilitate understanding, the described example power conversion devices generate single-phase AC and have a single leg that includes an upper arm (switch element 14) and a lower arm (switch element 15). However, the configuration of embodiments can also be applied to a power conversion device that generates three-phase AC and has three legs. For the three-phase AC type of the power conversion device, detectors 17 are each provided in the corresponding one of the legs to detect the output current of each leg to ensure detection and determination of a resonance frequency abnormality.

The power conversion devices of the embodiments can also be configured to use, as the switch elements 14 and 15, switch elements made of a wide band gap semiconductor having a wider band gap than that of silicon. The wide band gap semiconductor is, for example, silicon carbide, gallium nitride-based material, or diamond. The switch element made of wide band gap semiconductor has a high voltage withstand capability and a high allowable current density. Such characteristics allow for a reduced size of the switch element, and use of the reduced size of the switch element thus allows for a reduced size of a semiconductor module incorporating the switch element.

The wide band gap semiconductor has high heat resistance, thus allowing reduction in size of heat radiation fins of a heat sink and the use of air for cooling of a water cooler, which enable the size of the semiconductor module to be further reduced. Furthermore, the lower power loss allows higher efficiency in the switch element, and thus allows a more highly efficient semiconductor module.

Preferably, both of the switch elements 14 and 15 are made of the wide band gap semiconductor, but either one of the switch elements may be made of the wide band gap semiconductor. In that case, the effect described in Embodiment 1 can also be obtained.

REFERENCE SIGNS LIST

1 Resonant inverter circuit
2 Control device
3 DC power source
4 Ground
5 Load circuit
11 Filter capacitor
12, 13 Resonant capacitor
14, 15 Switch element
16 Resonant transformer
17 Detector
21 Current detector
22 Resonance frequency determiner
23 Controller
24, 25 Register
26, 27 Comparator
28 Shift register
29 Adder
30 Subtractor

The invention claimed is:

1. A power conversion device, comprising:
a resonant inverter circuit including two or more switch elements;
a detector to detect output currents of the switch elements;
a resonance determiner to determine that a resonance frequency of the resonant inverter circuit is abnormal when a number of times, in which an absolute value of a current detected by the detector at turn-off of the switch elements is equal to or greater than a threshold, is equal to or greater than a predetermined number of times that is two or more during a predetermined period that is equal to or longer than two switching periods of the switch elements; and
a controller to cause the resonant inverter circuit to stop a switching operation when the resonance determiner determines that the resonance frequency of the resonant inverter circuit is abnormal.

2. The power conversion device according to claim 1, wherein the resonance determiner further determines that the resonance frequency of the resonant inverter circuit is abnormal when the absolute value of the current detected by the detector for each turn-off of the switch elements continues to be equal to or greater than the threshold a predetermined number of times.

3. The power conversion device according to claim 1, wherein the switch elements are made of a wide band gap semiconductor.

4. The power conversion device according to claim 3, wherein the wide band gap semiconductor is made of silicon carbide, gallium nitride-based material, or diamond.

5. The power conversion device according to claim 1, wherein the resonance determiner further comprises:
shift registers, wherein a quantity of the shift registers is determined by subtracting 1 from a value obtained by dividing the predetermined period by a switching period, the shift registers being connected in series;
a first comparator to compare an absolute value of a current value outputted by the detector with the threshold and to input a result of the comparison between the absolute value of the current value outputted by the detector and the threshold into a first shift register of the shift registers;
a subtractor into which an output value of a last shift register of the shift registers is inputted;
an adder to add, to an output of the subtractor, the result of the comparison by the first comparator; and
a second comparator to compare the output of the subtractor with the predetermined number of times,
wherein the subtractor subtracts the output value of the last shift register from an output value of the adder, and the resonance determiner outputs a result of comparison by the second comparator to the controller.

* * * * *